US008545618B2

(12) United States Patent
Fischer

(10) Patent No.: US 8,545,618 B2
(45) Date of Patent: Oct. 1, 2013

(54) STABLE AQUEOUS SILICA DISPERSIONS

(75) Inventor: Ulrich Fischer, Moembris (DE)

(73) Assignee: Evonik Degussa GmbH, Essen (DE)

( * ) Notice: Subject to any disclaimer, the term of this patent is extended or adjusted under 35 U.S.C. 154(b) by 331 days.

(21) Appl. No.: 12/446,365

(22) PCT Filed: Oct. 17, 2007

(86) PCT No.: PCT/EP2007/061080
§ 371 (c)(1),
(2), (4) Date: Apr. 20, 2009

(87) PCT Pub. No.: WO2008/046854
PCT Pub. Date: Apr. 24, 2008

(65) Prior Publication Data
US 2010/0319582 A1  Dec. 23, 2010

(30) Foreign Application Priority Data

Oct. 20, 2006 (DE) .................. 10 2006 049 526

(51) Int. Cl.
*C09D 1/02* (2006.01)

(52) U.S. Cl.
USPC ....................................................... 106/600

(58) Field of Classification Search
USPC ............ 516/81, 85; 106/38.3, 600; 423/338; 510/119
See application file for complete search history.

(56) References Cited

U.S. PATENT DOCUMENTS

| 5,944,866 | A * | 8/1999 | Chen et al. ................ 65/395 |
| 6,207,142 | B1 * | 3/2001 | Odds et al. ................ 424/70.8 |
| 6,380,265 | B1 * | 4/2002 | Pryor et al. ................ 516/85 |
| 6,849,584 | B2 * | 2/2005 | Geary et al. ................ 510/119 |
| 2004/0097600 | A1 * | 5/2004 | Greenwood et al. ........... 516/86 |
| 2004/0106697 | A1 | 6/2004 | Lortz et al. |
| 2008/0096984 | A1 | 4/2008 | Gottschalk-Gaudig et al. |
| 2011/0094418 | A1 | 4/2011 | Chapman |

FOREIGN PATENT DOCUMENTS

| CN | 1675128 | 9/2005 |
| DE | 102 38 463 | 3/2004 |
| JP | 2003 176123 | 6/2003 |
| JP | 2004 43298 | 2/2004 |
| JP | 2005/145812 | 6/2005 |
| WO | WO 2006002085 | 1/2006 |
| WO | WO 2006097240 | 9/2006 |

OTHER PUBLICATIONS

Paik, U. et al., "Rheological and electrokinetic behavior associated with concentrated nanosize silica hydrosols" Materials Chemistry and Physics, vol. 91, No. 1, pp. 205-211. XP004748253, (2005).
Pham, K. et al., "Surface modification for stability of nano-sized silica colloids", Journal of Colloid and Interface Science, vol. 315, No. 1, pp. 123-127, XP022258520, Aug. 2007.
Karimian, H. et al., "Halos mechanism in stabilizing of colloidal suspensions: Nanoparticle weight fraction and pH effects", Journal of the European Ceramic Society, vol. 27, No. 1, pp. 19-25, XP005848769, Aug. 2006.
U.S. Appl. No. 12/446,333, filed Apr. 20, 2009, Fischer, et al.
Wang Xiangtian et al., "Preparation of Aqueous Dispersion of the Ultrafine $SiO_2$ Powder", Journal of East China University of Science and Technology, vol. 24, No. 3, pp. 373-377, Jun. 3, 1998.
Chinese Office Action in patent application No. 200780047562.X issued May 17, 2012.
Chinese Office Action in Patent Application No. 200780047562.X issued Nov. 24, 2010.
First page of Office Action issued in corresponding JP Application No. 2009-532793.

* cited by examiner

*Primary Examiner* — Pegah Parvini
(74) *Attorney, Agent, or Firm* — Oblon, Spivak, McClelland, Maier & Neustadt, L.L.P.

(57) ABSTRACT

The invention relates to silica dispersions that have a long shelf-life, to a method for producing the same and to their use in the construction industry as concrete admixtures and in the paper industry for producing or coating paper.

27 Claims, 2 Drawing Sheets

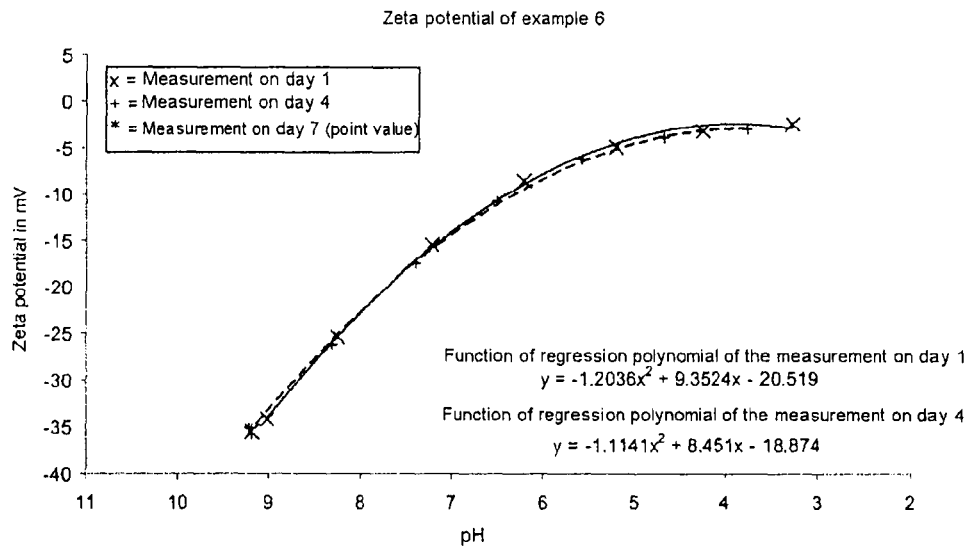
Figure 1: zeta potential of the dispersion according to example 6 after hot storage test at 50°C for 7 days
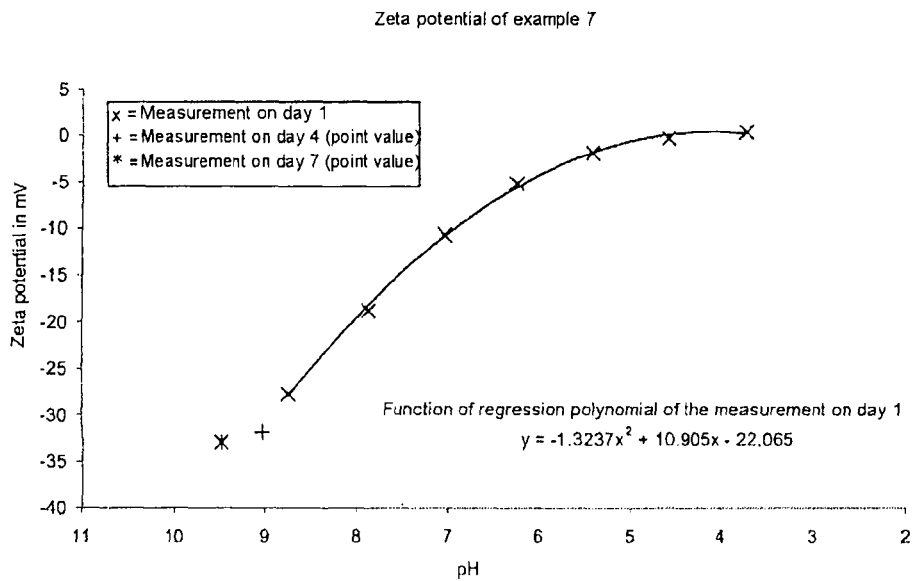
Figure 2: zeta potential of the dispersion according to example 7 after hot storage test at 50°C for 7 days

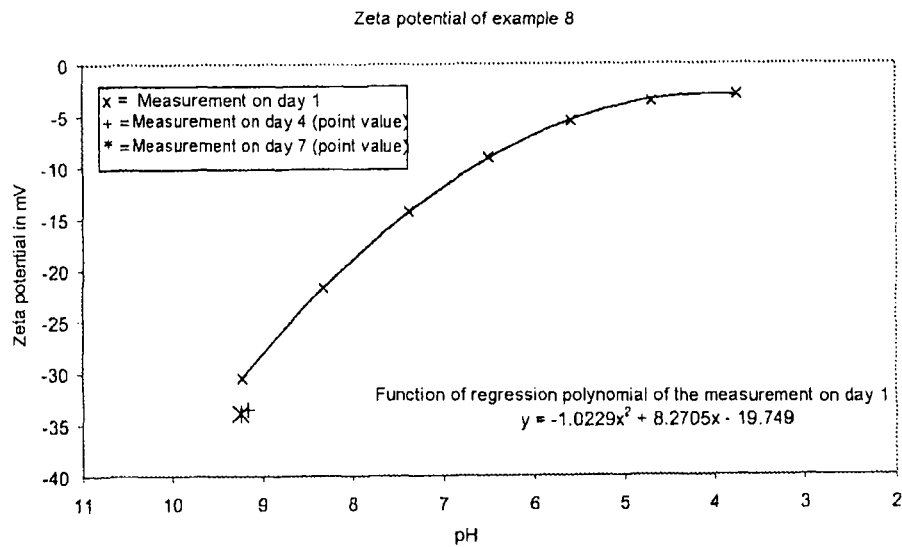
Figure 3: zeta potential of the dispersion according to example 8 after hot storage test at 50°C for 7 days
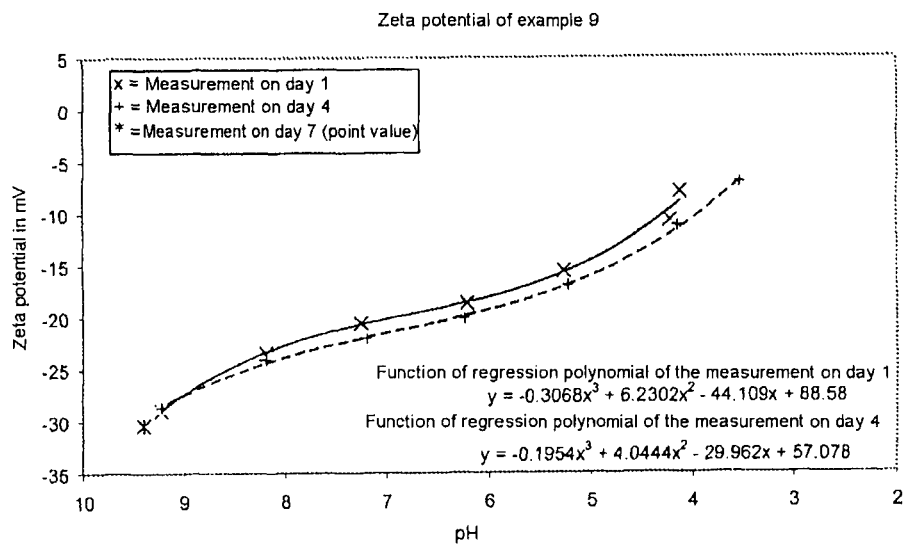
Figure 4: zeta potential of the dispersion according to example 9 after hot storage test at 50°C for 7 days

STABLE AQUEOUS SILICA DISPERSIONS

BACKGROUND OF THE INVENTION

FIELD OF THE INVENTION

The invention relates to storage-stable dispersions of precipitated silicon dioxide and/or silicates, to a process for preparation thereof and to the use thereof.

DISCUSSION OF THE BACKGROUND

Dispersions based on precipitated silicon dioxide have already been described in the prior art. The core subject of the publications of the prior art is the storage stability of the dispersions.

For example, Japanese published specification 09142827 describes stable silica dispersions. The storage stability of the dispersions disclosed in Japanese published specification 09142827 is achieved by virtue of the mean particle size of the silica particles being less than 100 nm. These dispersions have the disadvantage that it is very complicated and energy-intensive to grind silica particles to such small particle sizes. The process described in Japanese published specification 09142827 therefore does not appear to be of any technological relevance from economic aspects.

EP 0368722, EP 0329509, EP 0886628 and EP 0435936 describe dispersions of silicas stabilized by means of stabilizers. The stabilizers are added, among other reasons, to prevent deposits. The stabilizers are, for example, biogum, or a system composed of aluminum compounds and anionic dispersants, or latex, or finely divided solids, which are chemically and physically compatible with the silicon dioxide. The use of such stabilizers is disadvantageous both for reasons of cost and with regard to the later use of the dispersions. It would therefore be desirable to be able to prepare dispersions which are storage-stable without stabilizers.

EP 0768986 describes dispersions without stabilizer. However, the examples show that the dispersions described in EP 0768986 are insufficiently storage-stable, and instead a viscosity increase by a factor of 10 is detected after only 10 days.

A completely different concept is disclosed in EP 0736489. A dispersion is described here, which should gelate after no later than 48 hours. This gelation is controlled by adding assistants such that it is reversible under the action of gentle shear forces, and the gel can thus easily be stirred up again to give a dispersion. However, this stirring means an additional working step and additional mechanical stresses on the silicon dioxide particles.

A further approach to the preparation of storage-stable dispersions is disclosed by US 2004/0079504. In that document, doped silicas, i.e. silicas on whose surfaces an at least divalent metal ion is bound, are suspended. This is disadvantageous in that specially doped silicas first have to be prepared. This firstly requires additional working steps (doping), and the costs of production are secondly increased. Doping of silicas is additionally disadvantageous from ecological aspects, i.e., for example, wastewater aspects.

As stated above, it has to date been impossible in spite of great efforts to prepare sufficiently storage-stable dispersions of precipitated silicon dioxide. The effect of this is that the users of silica dispersions, for example the paper or construction industry, are still required to purchase silica in powder form and to prepare dispersions themselves, i.e. directly before the use thereof. This in turn means, for the users of the dispersions, not only a higher level of labor, but that they also have to maintain storage capacities for silica powder in addition to the at least short-term storage capacities for the dispersions.

It would therefore be desirable to be able to prepare dispersions which are sufficiently storage stable that the silica can be processed further to a dispersion directly after its preparation, and the dispersion obtained in this way is sufficiently storage-stable to be transportable to the user and be usable there without further measures. This would be highly advantageous for the user of silica dispersions as described above.

There is therefore still a high demand for storage-stable and inexpensive silicon dioxide dispersions.

SUMMARY OF THE INVENTION

Proceeding from the above-described prior art, it was thus an object of the present invention to provide silicon dioxide dispersions and a process for preparation thereof, which have at least some disadvantages of the prior art dispersions only to a reduced degree, if at all.

Further objects which are not stated explicitly are evident from the overall context of the description, examples and claims of the present application.

It has now been found that, surprisingly, it is possible to prepare storage-stable silicon dioxide dispersions when the silicon dioxide particles in the dispersion have a very small but not too small a mean particle size, the pH of the dispersion is established within the slightly alkaline to alkaline range, and when the zeta potential of the dispersions is sufficiently low.

The present application therefore provides silicon dioxide dispersions and a process for preparation thereof, as defined and described in the claims, the description and the examples of the present application.

BRIEF DESCRIPTION OF THE DRAWINGS

FIG. 1 shows a graphic plot of the zeta potential of the dispersion according to example 6 after hot storage test at 50° C. for 7 days.

FIG. 2 shows a graphic plot of the zeta potential of the dispersion according to example 7 after hot storage test at 50° C. for 7 days.

FIG. 3 shows a graphic plot of the zeta potential of the dispersion according to example 8 after hot storage test at 50° C. for 7 days.

FIG. 4 shows a graphic plot of the zeta potential of the dispersion according to example 8 after hot storage test at 50° C. for 7 days.

DETAILED DESCRIPTION OF THE INVENTION

The present invention provides, more particularly, dispersions comprising at least one silicon dioxide, characterized in that
  the silicon dioxide, preferably a precipitated silicon dioxide and/or a silicate, has a BET surface area of greater than 50 $m^2/g$,
  the silicon dioxide agglomerates in the dispersion have a mean particle size $d_{50}$ of from 130 to 800 nm,
  the proportion of silicon dioxide is from 5 to 50% by weight, based on the total mass of the dispersion,
  the pH of the dispersion is >8,
  and the zeta potential of the dispersion at pH 9 is less than −20 mV.

The present invention additionally provides a process for preparing dispersions comprising at least one silicon dioxide, characterized in that silicon dioxide particles, preferably precipitated silicon dioxide and/or a silicate, are ground and dispersed by means of a suitable dispersing unit, and the pH of the dispersion is adjusted in the course of the process, such that the mean particle size $d_{50}$ of the silicon dioxide particles in the dispersion is between 130 and 800 nm, the pH of the dispersion is >8 and the zeta potential of the dispersion at pH 9 is less than −20 mV.

The invention likewise provides for the use of the inventive silicas
  in the papermaking sector, for example for inkjet coatings,
  in the construction industry, for example as a concrete additive,
  for control of rheology, for example of inkjet inks and adhesives,
  in varnish and coating systems, for example for improving hardness and scratch resistance,
  as a $TiO_2$ extender in disperse dyes,
  in the final finishing of textiles, for example as a reinforcing filler in the fiber.

The inventive dispersions are notable in that they are storage-stable without addition of stabilizers. This means that it is possible to dispense with the stabilizers needed in prior art dispersions. This in turn has the advantage that the raw material costs can be lowered and working steps in the preparation of the dispersion can be dispensed with.

The inventive dispersions exhibit only a very low tendency, if any, to sediment. In other words, it is generally unnecessary to stir up deposits again before use, or to subject the dispersion to a constant stirring process.

The inventive dispersions additionally have the advantage that they can be prepared without any additives which are possibly troublesome in the application. This allows new fields of application to be opened up, which were not previously accessible owing to the troublesome effects of the stabilizers.

A further advantage of the inventive dispersions is considered to be that the mean particle size remains substantially unchanged during storage, i.e. no product change, for example as a result of reagglomeration, is detectable.

The performance properties of the inventive dispersions meet the necessary standards, such as good storage stability and simple handling.

The invention is described in detail hereinafter.

In the present invention, the silicon dioxide or the silicon dioxide particles are preferably precipitated silicas and/or silicates. Particular preference is given to precipitated silicas.

The terms "silica", "precipitated silica" and "precipitated silicon dioxide" are used synonymously. In all cases, these are understood to mean precipitated silicon dioxide as described, for example, in *Ullmann's Encyclopedia of Industrial Chemistry*, 5th edition, vol. A23, p. 642-647. To avoid pure repetition, the content of this publication is hereby incorporated explicitly into the subject matter and the description of the present invention. Precipitated silicon dioxide may have BET surface areas up to 800 $m^2/g$ and is obtained by reaction of at least one silicate, preferably of an alkali metal silicate and/or alkaline earth metal silicate, with at least one acidifier, preferably at least one mineral acid. In contrast to silica gels (see *Ullmann's Encyclopedia of Industrial Chemistry*, 5th edition, vol. A23, p. 629-635), precipitated silicas do not consist of a homogeneous three-dimensional $SiO_2$ network, but of individual aggregates and agglomerates. A particular feature of precipitated silicon dioxide is the high proportion of so-called internal surface area, which is reflected in a very porous structure with micro- and mesopores.

Precipitated silicas differ from fumed silicas, which are also known as aerosils (see *Ullmann's Encyclopedia of Industrial Chemistry*, 5th edition, vol. A23, p. 635-642). Fumed silicas are obtained by means of flame hydrolysis from silicon tetrachloride. Owing to the completely different preparation process, fumed silicas, among other properties, have different surface properties. This is expressed, for example, in the lower number of silanol groups on the surface. The behaviors of fumed silicas and precipitated silicas in aqueous dispersions, which are determined principally by the surface properties, therefore cannot be compared with one another. One advantage of precipitated silicas over fumed silicas is that they are significantly less expensive.

Silicates are described in *Ullmann's Encyclopedia of Industrial Chemistry*, 5th edition, vol. A23, p. 661-717. To avoid pure repetition, the content of this publication is hereby incorporated explicitly into the subject matter and the description of the present invention.

The inventive dispersions are preferably aqueous dispersions, i.e. at least one constituent, more preferably the main constituent, of the liquid phase is water, preferably deionized water. Apart from water and at least one silicon dioxide, the inventive dispersions preferably do not contain any further liquid additives, especially none which prevent the sedimentation of the silicon dioxide particles. More preferably, the inventive dispersions do not contain any further additives at all in addition to water and silicon dioxide.

It is possible that the inventive dispersions comprise the silicon dioxide as the only solid. This may be advisable especially when the dispersions are to serve as a masterbatch for various applications.

The BET surface area of the silicon dioxide present in the inventive dispersions is preferably in the range of 50-800 $m^2/g$, more preferably in the range of 50-500 $m^2/g$, preferably in the range of 50-250 $m^2/g$. This is necessary in order to ensure a high interaction with the surrounding medium.

The BET surface area is not measured on individual particles but corresponds to the total surface area of all particles present in the sample analyzed, normalized to 1 gram. Should a plurality of different silicon dioxides be present in the inventive dispersions, the BET surface area does not correspond to the BET surface areas of the individual silicon dioxides used to prepare the dispersion, but to the total surface area of all particles measured on a representative sample of the dispersion, normalized to 1 gram. In this case, the aforementioned preferred ranges for the BET surface area likewise apply.

In order to achieve the desired sedimentation stability, it has been found to be necessary that the mean particle size $d_{50}$ of the silicon dioxide agglomerates of the inventive dispersion is in the range from 130 to 800 nm, preferably from 150 to 600 nm, more preferably from 150 to 450 nm, especially preferably from 150 to 400 nm, even more preferably from 170 to 300 nm and especially preferably from 180 to 300 nm. Values below 130 nm can be established by technical means only with very great difficulty.

It has additionally been found to be essential that the pH of the dispersions must not be too low. The pH of the inventive dispersions has an especially stabilizing effect on the sedimentation properties of the dispersion and is in the range of greater than 8, preferably from 8.0 to 14,1 more preferably from 8.5 to 12, even more preferably from 8.7 to 10 and especially preferably from 9 to 9.5.

Finally, it has been found that not only the particle size and the pH but also the zeta potential of the inventive dispersions constitutes an important criterion for the storage stability thereof. The zeta potential is a measure for the surface charge of the particles and describes the charge interaction between a liquid and the particle surface. Zeta potentials are greatly dependent on the pH of the dispersion and can therefore be compared with one another only at the same pH. The inventors have found that the silicon dioxide particles in the inventive dispersions repel one another at sufficiently great surface charge, such that coagulation of the particles is prevented. It is therefore necessary that the zeta potential of the inventive dispersions at a pH of 9 is less than −20 mV, preferably from −20 to −45 mV, more preferably from −25 to −40 mV, most preferably from −30 to −40 mV.

The inventive dispersions have a proportion of silicon dioxide of from 5 to 50% by weight, based on the total amount of the dispersion. The silicon dioxide content is more preferably from 10 to 50% by weight, even more preferably from 20 to 40% by weight and especially preferably from 20 to 35% by weight. Dispersions with a relatively low silicon dioxide content generally have a better stability than more highly filled dispersions. Dispersions with less than 5% by weight of silicon dioxide are uneconomic owing to the high water content.

At silicon dioxide contents of up 30% by weight, the inventive dispersions exhibited a water-like viscosity. The viscosity of the inventive dispersions is therefore preferably less than 500 mPas, more preferably from 0.1 to 250 mPas, even more preferably from 1 to 100 mPas and especially preferably from 1 to 50 mPas.

It has additionally been found to be advantageous for the stability of the inventive dispersions when a sufficient portion of the structure of the silicon dioxide is destroyed during the grinding. Without being bound to a particular theory, the applicant is of the view that this reduced structure influences the interactions of the silicon dioxide particles in such a way that the stability of the dispersions is increased. In order to be able to determine the structural properties of the silicon dioxide particles in the inventive dispersions, the dispersions are first dried in a drying cabinet and the dried silicon dioxide particles are then studied by means of mercury porosimetry. More exact information regarding the performance of the measurements can be found in the description of the test methods further down.

In a preferred embodiment of the inventive dispersions, the silicon dioxide particles therefore have a pore volume of the pores with a particle size of 10-1000 nm in the range from 0.05 to 1.0 ml/g, preferably 0.1 to 0.75 ml/g, more preferably 0.15 to 0.6 ml/g and most preferably 0.2 to 0.55 ml/g.

In a further especially preferred embodiment of the inventive dispersions, the pore maximum of the silicon dioxide particles is in the range of 5-50 nm, preferably 5 to 40 nm, the pore maximum in a first alternative embodiment being in the range from 5 to 20 nm, preferably 7 to 15 nm, and the pore maximum in a second alternative embodiment being in the range from 20 to 40 nm, preferably 25 to 35 nm.

The inventive dispersions can be prepared by a process in which silicon dioxide particles are ground down to a mean particle size $d_{50}$ between 130-800 nm, preferably 150 to 600 nm, more preferably 150 to 450 nm, especially preferably 150 to 400 nm and most preferably 180 to 300 nm, such that they afford a dispersion with a zeta potential at pH 9 of less than −20 mV, preferably −20 to −45 mV, more preferably −25 to −40 mV, most preferably −30 to −40 mV, and a pH of >8, preferably 8.0 to 14, more preferably 8.5 to 12, even more preferably 8.7 to 10 and especially preferably 9 to 9.5.

This process preferably comprises at least some of the following steps:

a. preparing a preliminary dispersion by dispersing silicon dioxide in a liquid medium, preferably water,
b. optionally adjusting the pH of the preliminary dispersion
c. grinding the silicon dioxide particles in the preliminary dispersion,
d. optionally concentrating the dispersion obtained after step c) to the desired solids content.

In step a), a preliminary dispersion is prepared. In one embodiment, silicon dioxide particles are dispersed for this purpose in a liquid component, preferably water, more preferably deionized water. However, it is also possible to redisperse a filtercake, i.e. not to first dry the silicon dioxide particles. This second embodiment of the process according to the invention is of course associated with economic advantages over the first embodiment. Any mixed forms of these two embodiments are likewise possible, i.e. it is possible to redisperse a filtercake and then to add dried silicon dioxide, and vice versa. It is also possible to prepare base dispersions of mixtures of at least two different silicon dioxides.

The preliminary dispersions are prepared in a manner known per se by means of suitable dispersing units. For instance, the dispersion of the silicon dioxide powder can be performed in apparatus which introduces a comparatively low shearing energy into the system (for example dissolvers, rotor-stator systems). However, it is also possible to use the same units which are used in step c).

In an optional step b), the pH of the base dispersion is adjusted to the desired value, i.e. a value of >8, preferably 8.0 to 14, more preferably 8.5 to 12, even more preferably 8.7 to 10 and especially preferably 9 to 9.5. According to the pH of the silicon dioxide, this can be done by adding a basic component or an acidifier. It is possible in principle to use any basic medium, preferably an alkali metal or alkaline earth metal hydroxide or organic bases or ammonia. In principle, the acidifier used may also be any acidic medium, for example mineral acids, organic acids.

In one process variant, it is also possible to use silicon dioxide whose pH has already been adjusted such that the silicon dioxide itself adjusts the pH of the dispersion to the desired value, i.e. step b) can be dispensed with. In this variant, the pH of the silicon dioxide can be adjusted in one of the preparation steps of the silicon dioxide, for example during the precipitation or during the drying, by adding suitable basic or acidic media.

In this regard, suitable techniques are known to those skilled in the art.

The preliminary dispersion whose pH has been adjusted correspondingly is comminuted in step c) by means of a suitable unit. Without being bound to a particular theory, the influence of the comminution method on the structure of the silicon dioxide and/or the surface thereof appears to be crucial for the later stability of the resulting dispersion.

In principle, it is possible to use any suitable dispersing unit, provided that it is suitable for influencing the structure and surface of the silicon dioxide such that the zeta potential and, in the particular embodiment, also the pore volume are within the suitable range. For instance, suitable dispersing units are those whose energy input is sufficient to disperse the precipitated silicon dioxide powder or the filtercake such that their agglomerates, after the dispersion, have a mean particle size of from 130 to 800 nm. For this purpose, specific energy inputs according to the solid of from 0.01 to 10 kWh/kg are required. In order to achieve these high specific energy inputs, it is possible in principle to use processes with a high power density and low residence time, processes with a low power density and high residence times, and intermediate forms.

High-pressure systems, for example nanomizers, microfluidizers and other nozzle systems in which the dispersion flows through a nozzle under a high pressure of 50 up to 5000 bar and is dispersed by the dissipation of energy in and downstream of the nozzle achieve, in a single pass, very high energy inputs of already 5000 kJ/m$^3$ to 500 000 kJ/m$^3$. Stirred ball mills, in contrast, lead to significantly lower specific energy inputs per pass of from 5 to 500 kJ/m$^3$. In order to achieve sufficient particle fineness, the dispersion must pass through the mill significantly more frequently, which leads to significantly higher stress frequencies than in high-pressure systems. The great stress frequency coupled with low intensity has a positive effect on the structure and the surface of the particles and hence the stability of the dispersion.

The inventors have found that it is advantageous to perform the grinding not in a high-pressure system, i.e. a system with a high power density and low residence time, but in a system with low power density and high residence time. This finding explains the fact that, in Japanese published specification 09-142827, where the grinding was effected with a high-pressure system, dispersions with particle sizes of the silica particles of 120-390 nm did not have sufficient storage stability. The dispersions prepared by the process according to the invention, in contrast, with the same particle size of the silicas, exhibited a good storage stability. The method of grinding apparently influences the structure of the resulting silica particles in such a way that the stability of the dispersions is crucially influenced.

In order to achieve high fill levels and to obtain a stable dispersion with low viscosity, shearing energies of >1000 kJ/m$^3$ should advantageously be applied. Particularly good results are achieved with stirred ball mills, high-pressure homogenizers or planetary ball mills. The operation of these mills is known to those skilled in the art.

The use of ball mills, especially stirred ball mills, was found to be particularly advantageous. The product can flow through the mill in shuttle mode or in circulation mode. Owing to high circulation rates, an arrangement in circulation mode is simpler to achieve here. The circulation performance may vary from 10 to 300 kg/h and is advantageously in the range from 25 to 200 kg/h, more preferably in the range of 50-150 kg/h and especially preferably in the range of 80-120 kg/h.

The stirrer may be configured in the form of disks, pins, pin-counterpin arrangements, an annular gap or the like. Preference is given to a disk arrangement. Depending on the dispersibility of the product and the amount used, the grinding time is 10 min up to 80 hours, preferably 0.5 to 50 hours, more preferably 1 to 25 hours and especially preferably 5 to 15 hours. This allows specific energy inputs (based on kg of dispersion) of from 0.01 to 10 kWh/kg to be achieved. Energy inputs are preferably from 0.05 to 10 kWh/kg, more preferably 0.1 to 5 kWh/kg, even more preferably 0.1 to 0.5 kWh/kg and especially preferably 0.25 to 0.3 kWh/kg. The grinding bodies may consist of glass, aluminum oxide, zirconium oxide or of further inorganic oxides, and various mixtures of inorganic oxides. Owing to the high density, it is advantageous to use zirconium oxide grinding bodies which have been stabilized against attrition by means of yttrium oxide. The grinding body size may vary from 20 μm to a few mm; it is advantageous to use grinding bodies of size 0.02 to 10 mm, more preferably 0.05 to 5 mm, even more preferably 0.1 to 1 mm and especially preferably 0.2-0.4 mm. The grinding body fill level, based on the free volume of the grinding space, may vary from 60 to 99%, preferably 70-95%, more preferably 80 to 95% and especially preferably 90 to 95%. The peripheral speed of the grinding tool may vary from 1 m/s up to 15 m/s, preferably 5 m/s to 15 m/s, more preferably 8 m/s to 12 m/s.

The grinding is optionally followed, in step d), by a concentration of the dispersion up to the desired silicon dioxide content. This concentration can be effected by any technique known to those skilled in the art, for example by reduction of the liquid medium, for example by vacuum evaporation, crossflow filtration, continuous or batchwise centrifugation, filtration, or by increasing the solids content.

The silicon dioxide used may in principle be any desired precipitated silicon dioxide or silicate. The silica or the silicate is selected essentially depending on the intended use of the dispersion. For example, in the case of dispersions for paper coatings, it may be necessary to use very absorptive starting silicas. Examples thereof are silicas with a DBP of >150 g/100 g. If the dispersion is to be used, for example, in the construction chemistry sector, for example as a concrete additive, particularly suitable starting silicas or silicates are those with a BET surface area of >150 m$^2$/g. Examples thereof are Sipernat 160® and Sipernat 312 AM®.

The inventive dispersions can be used
- in the papermaking sector, for example for inkjet coatings,
- in the construction industry, for example as a concrete additive,
- for control of rheology, for example of inkjet inks and adhesives,
- in varnish and coating systems, for example for improving hardness and scratch resistance,
- as a TiO$_2$ extender in disperse dyes,
- in the final finishing of textiles, for example as a reinforcing filler in the fiber.

Even though the inventive dispersions are preferably used without any additives, for example stabilizers, dispersants, preservatives, the addition of such additives to the dispersion and hence the adjustment of the dispersions to specific application requirements is of course not ruled out. However, it is emphasized once again that the inventive dispersions are stable even without stabilizers.

To characterize the dispersions, the following test methods are used:

Determination of the Mean Particle Size

The particle distribution of the inventive dispersions is determined by the principle of laser diffraction on a laser diffractometer (from Horiba, LA-920).

First, a sample of the silica dispersion is taken with stirring, transferred to a beaker and diluted by adding water without addition of dispersing additives so as to form a dispersion with a proportion by weight of approx. 1% by weight of SiO$_2$. To determine the particle size of powders, a dispersion with a proportion by weight of approx. 1% by weight of SiO$_2$ is prepared by stirring the powder into water.

Immediately after the dispersion, the particle size distribution of a sample of the dispersion is determined with the laser diffractometer (Horiba LA-920). For the measurement, a relative refractive index of 1.09 should be selected. All measurements are effected at room temperature. The particle size distribution and the relevant parameters, for example the mean particle size $d_{50}$, are calculated automatically by the instrument and presented in graphic form. The instructions in the operating manual should be noted.

Determination of the BET Surface Area

When the silica is not present in solid form, but in aqueous dispersion, the determination of the BET surface area should be preceded by performance of the following sample preparation:

100 ml of the silica dispersion are withdrawn with stirring, transferred to a porcelain dish and dried at 105° C. for 72 h. In order to remove organic constituents, the dried silica is heated to 500° C. for 24 h. Once the silica sample has cooled, it is comminuted with a spatula and the BET surface area is determined.

The BET surface area of silica in solid form is determined on the basis of ISO 5794-1/Annex D with the TRISTAR 3000 instrument (from Micromeritics) by the multipoint determination to DIN ISO 9277.

Determination of the pH

The pH of the aqueous dispersions is determined on the basis of DIN EN ISO 787-9 at 20° C. To determine the pH, the dispersions are diluted with water to a proportion by weight of 5% by weight of $SiO_2$ and analyzed at room temperature.

For the determination of the pH of silica powders, a 5% aqueous dispersion is prepared (5.00 g of silica per 100 ml of deionized water).

Determination of the Moisture Content or of the Drying Loss

The moisture content of silica is determined to ISO 787-2 after drying at 105° C. in a forced-air drying cabinet for 2 hours. This drying loss consists predominantly of water moisture.

Determination of Ignition Loss

This method is used to determine the weight loss of silica on the basis of DIN EN ISO 3262-1 at 1000° C. At this temperature, physically and chemically bound water escapes, as do other volatile constituents. The moisture content (TV) of the sample analyzed is determined by the above-described method of "determining the moisture content or the drying loss" to DIN EN ISO 787-2.

Determination of DBP Absorption

The DBP absorption (DBP number), which is a measure of the absorptivity of precipitated silica, is determined on the basis of the standard DIN 53601 as follows:

12.50 g of pulverulent or pelletized silica with moisture content 0-10% (if appropriate, the moisture content is adjusted by drying at 105° C. in a drying cabinet) are introduced into the kneader chamber (article number 279061) of the Brabender "E" absorptometer (without damping of the output filter of the torque transducer). With constant mixing (peripheral speed of the kneader paddles 125 rpm) dibutyl phthalate is added dropwise to the mixture at room temperature at a rate of 4 ml/min by means of "Brabender T 90/50 Dosimat". It is mixed in with only a small amount of force and is monitored using the digital display. Towards the end of the determination, the mixture becomes pasty, which is indicated by means of a rapid rise in the force required. When the display shows 600 digits (torque of 0.6 Nm), an electrical contact shuts off both the kneader and the DBP metering. The synchronous motor for the DBP feed is coupled to a digital counter, so that the consumption of DBP in ml can be read off.

The DBP absorption is reported in g/(100 g) and is calculated by the following formula:

$$DBP = \frac{V*D*100}{E} * \frac{g}{100\ g} + K$$

where
DBP=DBP absorption in g/(100 g)
V=consumption of DBP in ml
D=density of DBP in g/ml (1.047 g/ml at 20° C.)
E=starting weight of silica in g
K=correction value according to moisture correction table in g/(100 g)

The DBP absorption is defined for the anhydrous, dried silica. In the case of moist precipitated silicas, the correction value K should be included in the calculation of the DBP absorption. This value can be determined using the correction table which follows; for example, a water content of the silica of 5.8% would mean an additional contribution of 33 g/(100 g) for the DBP absorption. The moisture content of the silica is determined by the "determination of the moisture content and of the drying loss" method.

Moisture Content Correction Table for Dibutyl Phthalate Absorption (Anhydrous)

| % Moisture content | .% Moisture content | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Tamped Density

The tamped density is determined on the basis of DIN EN ISO 787-11.

A defined amount of a sample which has not been screened beforehand is introduced into a graduated glass cylinder and subjected to a fixed number of tamping operations by means of a tamping volumeter. During the tamping, the sample becomes compacted. The result obtained from the analysis performed is the tamped density.

The measurements are performed on a tamping volumeter with a counter from Engelsmann, Ludwigshafen, STAV 2003 type.

First, a 250 ml glass cylinder is tared on a precision balance. Subsequently, 200 ml of silica are introduced into the tared measuring cylinder with the aid of a powder funnel in such a way that no cavities form. This is achieved by tilting and rotating the cylinder about its longitudinal axis during the introduction. Subsequently, the amount of sample is weighed accurately to 0.01 g. Thereafter, the cylinder is tamped gently, such that the surface of the silica in the cylinder is horizontal. The measuring cylinder is inserted into the measuring cylinder holder of the tamping volumeter and subjected to 1250 tamping operations. After a single tamping procedure, the volume of the tamped sample is read off accurately to 1 ml.

The tamped density D(t) is calculated as follows:

$$D(t) = m*1000/V$$

D(t): tamped density [g/l]
V: volume of the silica after tamping [ml]
m: mass of the silica [g]

Determination of the $SiO_2$ Content

The $SiO_2$ content was determined to ISO 3262-19.

Determination of the Al and Na Content

The Al content is determined as $Al_2O_3$, the Na content as $Na_2O$. Both determinations are carried out to ISO 3262-18 by means of flame atomic adsorption spectrometry.

Determination of the Viscosity of the Dispersions

To determine the viscosity, the Rheo Stress 600 instrument from Haake is used. The sensor used is a DC 60/2° Ti (double cone) with a gap of 0.092 mm. The temperature is controlled during the measurement (measurement temperature=23° C.) by means of the internal temperature control unit which is controlled by means of the program.

After a zero measurement, i.e. without sample, approx. 11 ml of the dispersion are introduced into the measuring unit and the measurement is started. To determine the viscosity, the shear rate is increased continuously from 0.001 1/s to 100 1/s within 10 min and then, likewise continuously, slowed down from 100 1/s to 0.001 1/s within 10 min. The measurement is effected according to the operating instructions. When the measurement is complete, the measurement data are displayed by means of the integrated software.

Determination of the Zeta Potential

To determine the zeta potential, a DT 1200 electroacoustic spectrometer from Quantachrom GmbH is used. To determine the pH in the measurement, a BK511071 pH electrode from Beckmann Instruments, Inc. is used.

Approx. 120 ml of the dispersion to be analyzed are initially charged in a 200 ml jacketed vessel at a controlled temperature of 20° C. The analysis is affected while stirring constantly with a magnetic stirrer bar. The lid of the jacketed vessel contains the electroacoustic spectrometer, the pH electrode, a thermocouple and a cannula for metered addition of 1 mol/l nitric acid or for metered addition of 1 mol/l potassium hydroxide solution. All components are immersed approx. 1 cm into the dispersion.

The setting of the substance parameters ($SiO_2$: particle size $d_{50}$, solids concentration in % by weight; solvent: viscosity and density) on the DT 1200 instrument is followed by the automated determination of the zeta potential with addition of nitric acid in a pH range of pH=10-3.

Hg Porosimetry

The mercury porosimetry data are determined by means of Hg intrusion to DIN 66133 (with a surface tension of 480 mN/m and a contact angle of)140°).

100 ml of the silica dispersion are taken with stirring, transferred to a porcelain dish and dried at 105° C. for 72 h. In order to remove organic constituents, the dried silica is heated to 500° C. for 24 h. Once the silica sample has cooled, it is comminuted with a spatula and the Hg porosimetry measurement is carried out.

Before the measurement, the silica is subjected to a pressure treatment. For this purpose, a manual hydraulic press is used (order No. 15011 from Specac Ltd., River House, 97 Cray Avenue, Orpington, Kent BR5 4HE, U.K.). This involves weighing 250 mg of silica into a pellet die of internal diameter 13 mm from Specac Ltd. and, according to the display, loading it with 1 t. This load is maintained for 5 s and readjusted if appropriate. Subsequently, the sample is decompressed and dried at 105±2° C. in a forced-air drying cabinet for 4 h.

The silica is weighed accurately to 0.001 g into the type 10 penetrometer and, for good reproducibility of the measurement, the starting weight is selected such that the stem volume used, i.e. the percentage volume of Hg consumed to fill the penetrometer, is 20% to 40%. Subsequently, the penetrometer is evacuated slowly to 50 mm Hg and left at this pressure for 5 min.

The Autopore instrument is operated according to the operating instructions with Software Version IV 1.05. Each measurement is subject to a correction by an empty measurement of the penetrometer. The measurement range is 0.0025-420 MPa, using at least 136 equilibrium measurement points (instrument-specific criterion of 10 s) (in the range of 0.0025-0.25 MPa: 30 points, in the range of 0.25-15 MPa: 53 points, 15-150 MPa: 40 points, in the range of 150-420 MPa: 13 points). If appropriate, the software introduces further measurement points when the incremental intrusion volume is >0.04 ml/g. The intrusion curve is smoothed by means of the "smooth differentials" function of the instrument software.

The pore volume within the range from 10 to 1000 nm and the pore maximum are evaluated on the basis of the graphic representation where x axis=pore diameter and y axis=dV/d log D.

The examples which follow serve to illustrate and further explain the present invention, but do not restrict its scope in any way, since numerous modifications and variants will be obvious to a person skilled in the art.

EXAMPLES

General Process Description

The dispersions are prepared in a stirred ball mill (LME 4, from Netzsch). The grinding space and the disk stirrer consist of abrasion-resistant ceramic ($Al_2O_3$ or $ZrO_2$). The grinding balls made of yttrium-stabilized $ZrO_2$ have a diameter of from 0.2 to 0.4 mm and fill the grinding space to an extent of 90% (8.84 kg).

In step a), a preliminary dispersion is effected, by initially charging 22.5 kg of demineralized water in a 50 l vessel with a bottom outlet and then gradually stirring in 2.5 g of silica or silicate by means of a dissolver disk (speed=380-940 rpm; peripheral speed=3-7.4 m/s) until the silica or the silicate has been dispersed in the liquid.

In step b), the pH of the dispersion—if necessary (examples 1 and 2)—is adjusted to 9 with KOH. In examples 3 and 4, the pH of the dispersion is set automatically to 9 owing to the pH of the silica. The pH is checked regularly and optionally readjusted.

To achieve the desired fineness, the dispersion is conducted through the ball mill in circulation in a step c). In all experiments, the peripheral speed remains constant at 10 m/s and the throughput at approx. 100 kg/h.

Addition in portions of further silica in the reservoir vessel further increases the concentration of $SiO_2$ in the dispersion, while the mill continues to be operated in circulation.

Examples 1-4

Precipitated silicas are used in examples 1 to 3, and a silicate in example 4.

The silica according to example 1 is Sipernat 160® (a synthetically prepared silicon dioxide from Degussa AG). The silica according to example 2 is the commercial product Sipernat 312 AM®, a synthetically prepared silicon dioxide, from Degussa AG. The silica from example 3 is Sipernat 360®, a synthetically prepared silicon dioxide, likewise from Degussa AG. In example 4, the aluminum silicate Sipernat 820 A®, silicic acid, aluminum sodium salt, from Degussa AG was used. The physicochemical characteristics of the silicas or silicates used for the preparation of the dispersions are reported in table 1.

The characteristics of the resulting dispersions are reproduced in table 2.

TABLE 1

| Test parameter | Unit | Silica 1 | Silica 2 | Silica 3 | Silicate 4 |
|---|---|---|---|---|---|
| BET surface area | m²/g | 165 | 270 | 50 | 85 |
| Mean particle size $d_{50}$ | μm | 11 | 13 | 18 | 7.5 |
| Tamped density | g/l | 80 | 180 | 210 | 300 |
| Drying loss | % by wt. | 4 | 5 | 6 | 6 |
| Ignition loss | % by wt. | 3 | 4 | 6 | 8 |
| pH | | 5.5 | 6 | 9 | 10.1 |
| DBP absorption | g/100 g | 250 | 250 | 245 | 200 |
| $SiO_2$ content | % by wt. | 99.4 | 99.5 | 98 | 82 |
| Al content as $Al_2O_3$ | % by wt. | — | — | — | 9.5 |
| Na content as $Na_2O$ | % by wt. | 0.3 | 0.2 | 1 | 8 |

TABLE 2

| Parameter | Unit | Example 1 | Example 2 | Example 3 | Example 4 |
|---|---|---|---|---|---|
| Silica used | | Silica 1 | Silica 2 | Silica 3 | Silicate 4 |
| $SiO_2$ content | % by wt. | 33.4 | 22.4 | 27.6 | 40.7 |
| Mean particle size $d_{50}$ | nm | 200 | 186 | 170 | 310 |
| pH | — | 9 | 9 | 9 | 9 |
| Pore volume of the pores with a diameter of 10-1000 nm | ml/g | 0.47 | 0.28 | 0.52 | 0.47 |
| Pore maximum | nm | 13 | 9 | 35 | 28 |
| BET surface area | m²/g | 131 | 199 | 64 | 93 |

Example 5

In order to assess the storage stability of the dispersions, they were subjected to a hot storage test at 50° C. over 7 days. Experience has shown that such storage conditions allow a statement about the storage stability over 3 months at room temperature. After 4 days and after 7 days, the mean particle size and the viscosity (at 96 s$^{-1}$) were each determined and compared with the values after preparation. The results are reproduced in table 3. A specimen is designated as storage-stable when these values, in the course of time, do not change or change only insignificantly and/or do not exceed a particular critical value.

Mean Particle Size

The mean particle sizes, reproduced in table 3, of the dispersions of examples 1 to 3 show that they have changed neither after 4 nor after 7 days. The differences found in the absolute measurements are within the natural error variations. In other words, the dispersions are storage-stable with regard to the mean particle size.

Viscosity

As table 3 shows, the viscosities of examples 1 and 3 are virtually constant or even improve slightly over the duration of several days. In example 2, an improvement over the period of 7 days can be reported. Example 4 again shows a slight increase in viscosity. With a value of 22 mPas, the viscosity is, however, still within an excellent range after 7 days at 50° C., and so no impairment in the usability of the dispersions whatsoever was found. A redispersion or liquefaction is not necessary even after 7 days of storage at 50° C.; all dispersions are usable immediately.

TABLE 3

| Parameter | Unit | After days | Example 1 | Example 2 | Example 3 | Example 4 |
|---|---|---|---|---|---|---|
| Mean particle size $d_{50}$ | nm | 0 | 200 | 186 | 170 | 310 |
| | | 4 | 190 | 180 | 190 | 230 |
| | | 7 | 190 | 200 | 170 | 230 |
| Viscosity (at 96 s$^{-1}$) | mPa*s | 0 | 28.4 | 39.5 | 3.57 | 16.4 |
| | | 4 | 25.5 | 24.9 | 3.68 | 19.0 |
| | | 7 | 26.3 | 18.0 | 3.39 | 22.0 |

Examples 6 to 9

The silicas or the silicate according to table 1 were again used to prepare dispersions according to the general process description. These had a higher solids content than in the dispersions according to examples 1 to 4. The solids contents and the particle sizes can be taken from table 4.

Subsequently, the zeta potential of these dispersions was determined on day 1, i.e. the day of preparation of the dispersions before the start of hot storage, and on day 3 and day 7 of the storage at 50° C. On day 1, the zeta potential was in each case determined as a function of pH, and the zeta potential at pH 9 was derived from the function of a regression polynomial placed through the measurements. In examples 6 and 9, this procedure was also employed for the measurement on the third day. In examples 7 and 8, on the third day, instead of a measurement against pH, individual measurements were carried out at pH values close to 9. On day 7, only individual measurements at pH values close to 9 were carried out for all examples 6 to 9. A graphic plot of the individual measurements of the particular analyses can be taken from FIGS. 1 to 4. Table 5 shows, as an extract from FIGS. 1 to 4, the zeta potentials at pH 9 determined by means of regression polynomials which have been placed through the individual measurements or, when no measurement against pH has been made, the zeta potentials of the individual measurements.

FIGS. 1 to 4 and table 5 show that the zeta potentials of examples 6 to 9 have changed only insignificantly, if at all, during the hot storage. As already stated above, the zeta potential is a measure for the surface charge of the silicas. FIGS. 1 to 4 show that the inventive dispersions possess a sufficiently negative zeta potential to repel one another so significantly that no coagulation of the particles takes place and hence sedimentation is avoided.

Since this zeta potential changes only insignificantly, if at all, even after 7 days of hot storage, the storage stability of the inventive dispersions is also confirmed at high solids contents.

TABLE 4

| Parameter | Unit | Example 6 | Example 7 | Example 8 | Example 9 |
|---|---|---|---|---|---|
| Silica used | | Silica 1 | Silica 2 | Silica 3 | Silicate 4 |
| $SiO_2$ content | % by wt. | 37.5 | 24 | 30 | 45 |
| Mean particle size $d_{50}$ | nm | 210 | 160 | 170 | 320 |
| pH | — | 9 | 9 | 9 | 9 |

TABLE 5

Zeta potentials of the dispersions according to examples 6 to 9 at the pH values specified in each case (RP means that this value was determined from a regression polynomial which was placed through the measurements marked in FIGS. 1 to 4).

| | Example 6 | Example 7 | Example 8 | Example 9 |
|---|---|---|---|---|
| Day 1 | −33.8398 (at pH 9, determined from RP) | −31.1397 (at pH 9, determined from RP) | −28.1694 (at pH 9, determined from RP) | −27.412 (at pH 9, determined from RP) |

TABLE 5-continued

Zeta potentials of the dispersions according to examples 6 to 9 at the pH values specified in each case (RP means that this value was determined from a regression polynomial which was placed through the measurements marked in FIGS. 1 to 4).

| | Example 6 | Example 7 | Example 8 | Example 9 |
|---|---|---|---|---|
| Day 4 | −33.0571 (at pH 9, determined from RP) | −31.88 (point value at pH 9.03) | −33.53 (point value at pH 9.17) | −27.4302 (at pH 9, determined from RP) |
| Day 7 | −35.16 (point value at pH 9.21) | −32.96 (point value at pH 9.48) | −33.9 (point value at pH 9.25) | −30.42 (point value at pH 9.4) |

The invention claimed is:

1. A dispersion, comprising:
at least one silicon dioxide as the only solid(s), and
water as the only liquid,
wherein
the silicon dioxide has a BET surface area of greater than 50 m$^2$/g,
agglomerates of the silicon dioxide in the dispersion have a mean particle size $d_{50}$ of from 150 to 800 nm,
a proportion of silicon dioxide is from 5 to 50% by weight, based on a total mass of the dispersion,
the pH of the dispersion is >8, and
the zeta potential of the dispersion at pH 9 is less than −20 mV;
wherein the silicon dioxide is not modified.

2. The dispersion of claim 1, wherein particles of the silicon dioxide have a pore volume of pores with a diameter of 10 - 1000 nm in the range from 0.05 to 1.0 ml/g.

3. The dispersion of claim 1, wherein a pore maximum of particles of silicon dioxide is in a range of 5- 50 nm.

4. The dispersion of claim 1, having a viscosity of less than or equal to 500 mPas.

5. The dispersion of claim 1, wherein the silicon dioxide has a BET surface area of 50 - 500 m$^2$/g.

6. The dispersion of claim 1, wherein the agglomerates in the dispersion have a mean particle size $d_{50}$ of from 150 to 450 nm.

7. The dispersion of claim 1, wherein the proportion of silicon dioxide is from 10 to 50% by weight, based on the total mass of the dispersion.

8. The dispersion of claim 1, wherein the pH of the dispersion is in a range from 8.5 to 12.

9. The dispersion of claim 1, wherein the zeta potential of the dispersion at pH 9 is in a range from −20 to −45 mV.

10. A process for preparing a dispersion according to claim 1 which comprises said at least one silicon dioxide, comprising:
grounding silicon dioxide particles in the presence of a dispersing unit down to a mean particle size $d_{50}$ between 150 and 800 nm and adjusting the pH such that a resulting dispersion has a pH of >8 and a zeta potential at pH 9 of less than −20 mV.

11. The process of claim 10, wherein the silicon dioxide is a precipitated silicon dioxide, a silicate, or a combination thereof.

12. The process of claim 10, wherein the process is performed such that at least one specific energy input of the dispersing unit into the dispersion per passage through the dispersing unit are in a range from 5 to 500 kJ/m$^3$.

13. The process of claim 10, wherein there is a product flow through the dispersing unit in shuttle or circulation mode.

14. The process of claim 10, wherein the dispersing is at least one ball mill.

15. The process of claim 10, further comprising:
(a) preparing a preliminary dispersion by dispersing silicon dioxide in a liquid medium; and
(c) grinding particles of the silicon dioxide in the preliminary dispersion.

16. The process of claim 15, further comprising at least one selected from the group consisting of:
(b) adjusting the pH of the preliminary dispersion; and
(d) concentrating the dispersion obtained after the grinding (c) to a desired solids content.

17. The process of claim 15 wherein, in at least one selected from the group consisting of the preparing (a) and the grinding (c), at least one dissolver, rotor-stator system, ball mill, or high-pressure homogenizer is present.

18. The process of claim 15, wherein at least one shearing energy of >1000 kJ/m$^3$ is applied in the grinding (c).

19. The dispersion of claim 1, wherein the silicon dioxide is at least one selected from the group consisting of a precipitated silicon dioxide and a silicate.

20. The dispersion of claim 5, wherein the silicon dioxide is at least one selected from the group consisting of a precipitated silicon dioxide and a silicate.

21. The process of claim 10, wherein the dispersing unit is at least one stirred ball mill or planetary ball mill.

22. The process of claim 15, wherein the liquid medium is water.

23. The process of claim 15 wherein, in at least one selected from the group consisting of the preparing (a) and the grinding (c), at least one dissolver, rotor-stator system, ball mill, or high-pressure homogenizer is present.

24. A dispersion, comprising:
at least one silicon dioxide as the only solid(s), and
water as the only liquid,
wherein
the silicon dioxide has a BET surface area of greater than 50 m$^2$/g,
agglomerates of the silicon dioxide in the dispersion have a mean particle size $d_{50}$ of from 150 to 800 nm,
a proportion of silicon dioxide is from 5 to 50% by weight, based on a total mass of the dispersion,
the pH of the dispersion is >8, and
the zeta potential of the dispersion at pH 9 is less than −20 mV;
wherein the silicon dioxide is a precipitated silicon dioxide, a silicate, or a combination thereof;
wherein the silicon dioxide and the silicate are not modified.

25. The dispersion of claim 24, which is prepared by grinding silicon dioxide particles in the presence of a dispersing unit down to a mean particle size $d_{50}$ between 150 and 800 nm and adjusting the pH such that the resulting dispersion has a pH of >8 and a zeta potential at pH 9 of less than −20 mV.

26. A dispersion, comprising:

at least one silicon dioxide as the only solid(s), and water with KOH dissolved therein as the only liquid, wherein the silicon dioxide has a BET surface area of greater than 50 $m^2/g$, agglomerates of the silicon dioxide in the dispersion have a mean particle size $d_{50}$ of from 150 to 800 nm, a proportion of silicon dioxide is from 5 to 50% by weight, based on a total mass of the dispersion, the pH of the dispersion is >8, and the zeta potential of the dispersion at pH 9 is less than −20 mV, wherein the silicon dioxide is not modified.

27. A dispersion, comprising:

at least one silicon dioxide as the only solid(s), and water with KOH dissolved therein as the only liquid, wherein the silicon dioxide has a BET surface area of greater than 50 $m^2/g$, agglomerates of the silicon dioxide in the dispersion have a mean particle size $d_{50}$ of from 150 to 800 nm, a proportion of silicon dioxide is from 5 to 50% by weight, based on a total mass of the dispersion, the pH of the dispersion is >8, and the zeta potential of the dispersion at pH 9 is less than −20 mV;

wherein the silicon dioxide is a precipitated silicon dioxide, a silicate, or a combination thereof;

wherein the silicon dioxide and the silicate are not modified.

* * * * *